United States Patent
Faris (10) Patent No.: US 6,986,964 B2
(45) Date of Patent: *Jan. 17, 2006

(54) METAL AIR CELL INCORPORATING IONIC ISOLATION SYSTEMS

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/884,084

(22) Filed: Jul. 2, 2004

(65) Prior Publication Data

US 2005/0014062 A1    Jan. 20, 2005

Related U.S. Application Data

(63) Continuation of application No. 10/145,278, filed on May 14, 2002, now Pat. No. 6,800,393.

(60) Provisional application No. 60/290,945, filed on May 14, 2001, provisional application No. 60/313,764, filed on Aug. 21, 2001.

(51) Int. Cl.
*H01M 2/14* (2006.01)
*H01M 6/30* (2006.01)
*H01M 12/06* (2006.01)

(52) U.S. Cl. .................. 429/110; 429/27; 429/113; 429/67; 429/68

(58) Field of Classification Search ............ 429/27, 429/67–70, 110, 133, 129, 116, 113, 130

See application file for complete search history.

(56) References Cited

U.S. PATENT DOCUMENTS

| | | | | |
|---|---|---|---|---|
| 4,560,626 A | * | 12/1985 | Joy | 429/27 |
| 4,714,662 A | * | 12/1987 | Bennett | 429/27 |
| 5,512,384 A | * | 4/1996 | Celeste et al. | 429/51 |
| 6,800,393 B2 | * | 10/2004 | Faris | 429/129 |
| 2002/0119368 A1 | * | 8/2002 | Tzeng | 429/137 |
| 2002/0160247 A1 | * | 10/2002 | Tzeng et al. | 429/28 |

* cited by examiner

*Primary Examiner*—Gregg Cantelmo
(74) *Attorney, Agent, or Firm*—Ralph J. Crispino (57) ABSTRACT

Electrochemical cell systems are disclosed herein that are capable of selective ionic isolation, oxidant isolation, oxidant removal, moisture control, and combinations thereof. Selective ionic isolation is generally effectuated by selectively eliminating or minimizing ionic communication between an anode and a cathode of the electrochemical cell.

7 Claims, 10 Drawing Sheets

FIGURE 14E though hydrogen-oxygen fuel cells typically operate at temperatures in the range of 150° C. to 1000° C. Metal air electrochemical cells are capable of delivering higher output voltages (1.5–3 Volts) than conventional fuel cells (<0.8V). Due to these advantages, metal air electrochemical cells can be used as power sources of all kind of applications, such as stationary or mobile power plant, electric vehicle or portable electronic device, etc.
METAL AIR CELL INCORPORATING IONIC ISOLATION SYSTEMS

RELATED APPLICATIONS

The present application is a continuation application of U.S. patent application Ser. No. 10/145,278, filed May 14, 2002, now U.S. Pat. No. 6,800,393 entitled "Metal Air Cell Incorporating Ionic Isolation Systems", which claims priority to U.S. Provisional Patent Application Nos. 60/290,945 filed on May 14, 2001 and 60/313,764 filed on Aug. 21, 2001, both entitled "Metal Air Cell Incorporating Reaction Rate Control Systems", both by Sadeg M. Faris, the entireties of which are both incorporated herein by reference.

BACKGROUND OF THE INVENTION

1. Field of the Invention

This invention relates to metal air cells, and particularly to a metal air cells incorporating systems for extending the useful lifetime thereof.

2. Description of the Prior Art

Electrochemical power sources are devices through which electric energy can be produced by means of electrochemical reactions. These devices include metal air electrochemical cells such as zinc air and aluminum air batteries. Metal air electrochemical cells include an anode, a cathode, and an electrolyte for ionic communication between the anode and the cathode. The anode is generally formed of metal materials. The cathode generally comprises an air diffusion electrode for oxidizing air. The electrolyte is usually a caustic liquid that is ionic conducting but not electrically conducting.

Metal air electrochemical cells have numerous advantages over traditional hydrogen-based fuel cells. Metal air electrochemical cells have high energy density (W*hr/Liter) and high specific energy (W*hr/kg). Further, the supply of energy provided from metal air electrochemical cells is virtually inexhaustible because the fuel, such as zinc, is plentiful and can exist either as the metal or its oxide. Additionally, metal air cells are capable of operating at ambient temperatures. The fuel may be solid state, therefore, safe and easy to handle and store.

Metal air electrochemical cells operate at ambient temperature, whereas hydrogen-oxygen fuel cells typically operate at temperatures in the range of 150° C. to 1000° C. Metal air electrochemical cells are capable of delivering higher output voltages (1.5–3 Volts) than conventional fuel cells (<0.8V). Due to these advantages, metal air electrochemical cells can be used as power sources of all kind of applications, such as stationary or mobile power plant, electric vehicle or portable electronic device, etc.

One of the principle obstacles of metal air electrochemical cells is the prevention of electrochemical reaction during periods of non-use, or self-discharging. Such unwanted reaction leads to unnecessary use of metal fuel, degradation of the cathode, and drying of the electrolyte.

Therefore, a need remains in the art for a metal air cell that minimizes or preferably eliminates self-discharging.

SUMMARY OF THE INVENTION

The above-discussed and other problems and deficiencies of the prior art are overcome or alleviated by the electrochemical cell systems of the present invention, wherein electrochemical cell systems capable of selective ionic isolation are provided. These systems are provided with displacement structures to facilitate physical separation, and thus ionic isolation, of electrodes in an electrochemical cell, particularly a metal air electrochemical cell. In further embodiments, an ionic barrier is used to effectuate ionic isolation.

The above-discussed and other features and advantages of the present invention will be appreciated and understood by those skilled in the art from the following detailed description and drawings.

DETAILED DESCRIPTION OF THE ILLUSTRATIVE EMBODIMENTS

Referring now to the drawings, illustrative embodiments of the present invention will be described. For clarity of the description, like features shown in the figures shall be indicated with like reference numerals and similar features as shown in alternative embodiments shall be indicated with similar reference numerals.

Various metal air structures may derive benefits from the present disclosure, including but not limited to the structures described in U.S. patent application Ser. No. 10/074,893 filed Feb. 11, 2002 entitled "Metal Air Cell System", by George Tzeng, the disclosure of which is incorporated by reference herein.

Figures 1A, 1B:
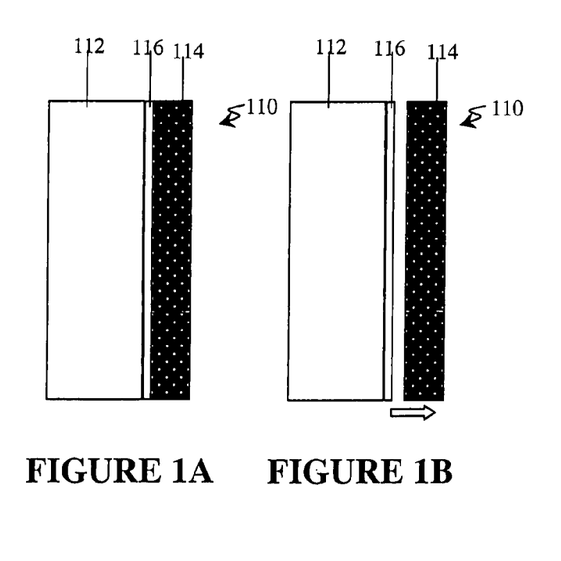
FIG. 1A is a schematic representation of an electrochemical cell having the electrodes in ionic communication.
FIG. 1B is a schematic representation of an electrochemical cell having the electrodes in ionic isolation.

FIG. 1A is a schematic representation of an electrochemical cell 110. Electrochemical cell 110 may be a metal air or metal oxygen cell, wherein the metal is supplied from a metal anode structure 112 and the oxygen is supplied to an oxygen cathode 114. The anode 112 and the cathode 114 are maintained in electrical isolation from on another by a separator 116. The shape of the cell and of the components therein is not constrained to be square or rectangular; it can be tubular, circular, elliptical, polygonal, or any desired shape. Further, the configuration of the cells components, i.e., vertical, horizontal, or tilted, may vary, even though the cell components are shown as substantially vertical in FIG. 1A.

Oxygen from the air or another source is used as the reactant for the air cathode 114 of the metal air cell 110. When oxygen reaches the reaction sites within the cathode 114, it is converted into hydroxyl ions together with water. At the same time, electrons are released to flow as electricity in the external circuit. The hydroxyl travels through the separator 116 to reach the metal anode 112. When hydroxyl reaches the metal anode (in the case of an anode 112 comprising, for example, zinc), zinc hydroxide is formed on the surface of the zinc. Zinc hydroxide decomposes to zinc oxide and releases water back to the alkaline solution. The reaction is thus completed.

The anode reaction is:

$$Zn + 4OH^- \rightarrow Zn(OH)_4^{2-} + 2e \quad (1)$$

$$Zn(OH)_4^{2-} \rightarrow ZnO + H_2O + 2OH^- \quad (2)$$

The cathode reaction is:

$$\tfrac{1}{2}O_2 + H_2O + 2e \rightarrow 2OH^- \quad (3)$$

Thus, the overall cell reaction is:

$$Zn + \tfrac{1}{2}O_2 \rightarrow ZnO \quad (4)$$

The anode 112 generally comprises a metal constituent such as metal and/or metal oxides and a current collector. Optionally an ionic conducting medium is provided within the anode 112. Further, in certain embodiments, the anode 112 comprises a binder and/or suitable additives. Preferably, the formulation optimizes ion conduction rate, capacity, density, and overall depth of discharge, while minimizing shape change during cycling.

The metal constituent may comprise mainly metals and metal compounds such as zinc, calcium, lithium, magnesium, ferrous metals, aluminum, and oxides of at least one of the foregoing metals, or combinations and alloys comprising at least one of the foregoing metals. These metals may also be mixed or alloyed with constituents including, but not limited to, bismuth, calcium, magnesium, aluminum, indium, lead, mercury, gallium, tin, cadmium, germanium, antimony, selenium, thallium, oxides of at least one of the foregoing metals, or combinations comprising at least one of the foregoing constituents. The metal constituent may be provided in the form of powder, fibers, dust, granules, flakes, needles, pellets, or other particles.

The anode current collector may be any electrically conductive material capable of providing electrical conductivity and optionally capable of providing support to the anode 112. The current collector may be formed of various electrically conductive materials including, but not limited to, copper, brass, ferrous metals such as stainless steel, nickel, carbon, electrically conducting polymer, electrically conducting ceramic, other electrically conducting materials that are stable in alkaline environments and do not corrode the electrode, or combinations and alloys comprising at least one of the foregoing materials. The current collector may be in the form of a mesh, porous plate, metal foam, strip, wire, plate, or other suitable structure.

The ionic conducting medium generally comprises alkaline media to provide a path for hydroxyl to reach the metal and metal compounds. The electrolyte generally comprises ionic conducting materials such as KOH, NaOH, LiOH, other materials, or a combination comprising at least one of the foregoing electrolyte media. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 45% ionic conducting materials. Other electrolytes may instead be used, however, depending on the capabilities thereof, as will be obvious to those of skill in the art.

The optional binder of the anode 112 primarily maintains the constituents of the anode in a solid or substantially solid form in certain configurations. The binder may be any material that generally adheres the anode material and the current collector to form a suitable structure, and is generally provided in an amount suitable for adhesive purposes of the anode. This material is preferably chemically inert to the electrochemical environment. In certain embodiments, the binder material is soluble, or can form an emulsion, in water, and is not soluble in an electrolyte solution. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

Optional additives may be provided to prevent corrosion. Suitable additives include, but are not limited to indium oxide; zinc oxide, EDTA, surfactants such as sodium stearate, potassium Lauryl sulfate, Triton® X-400 (available from Union Carbide Chemical & Plastics Technology Corp., Danbury, Conn.), and other surfactants; the like; and derivatives, combinations and mixtures comprising at least one of the foregoing additive materials. However, one of skill in the art will determine that other additive materials may be used.

The oxygen supplied to the cathode 114 may be from any oxygen source, such as air; scrubbed air; pure or substantially oxygen, such as from a utility or system supply or from on site oxygen manufacture; any other processed air; or any combination comprising at least one of the foregoing oxygen sources.

Cathode 114 may be a conventional air diffusion cathode, for example generally comprising an active constituent and a carbon substrate, along with suitable connecting structures, such as a current collector. Typically, the cathode catalyst is selected to attain current densities in ambient air of at least 20 milliamperes per squared centimeter ($mA/cm^2$), preferably at least 50 $mA/cm^2$, and more preferably at least 100 $mA/cm^2$. Of course, higher current densities may be attained with suitable cathode catalysts and formulations. The cathode 114 may also be a bi-functional, for example, which is capable of both operating during discharging and recharging.

An exemplary air cathode is disclosed commonly assigned U.S. Pat. No. 6,368,751, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

The carbon used is preferably be chemically inert to the electrochemical cell environment and may be provided in various forms including, but not limited to, carbon flake, graphite, other high surface area carbon materials, or combinations comprising at least one of the foregoing carbon forms.

The cathode current collector may be any electrically conductive material capable of providing electrical conductivity and preferably chemically stable in alkaline solutions, which optionally is capable of providing support to the cathode 114. The current collector may be in the form of a mesh, porous plate, metal foam, strip, wire, plate, or other suitable structure. The current collector is generally porous to minimize oxygen flow obstruction. The current collector may be formed of various electrically conductive materials including, but not limited to, copper, ferrous metals such as stainless steel, nickel, chromium, titanium, and the like, and combinations and alloys comprising at least one of the foregoing materials. Suitable current collectors include porous metal such as nickel foam metal.

A binder is also typically used in the cathode 114, which may be any material that adheres substrate materials, the current collector, and the catalyst to form a suitable structure. The binder is generally provided in an amount suitable for adhesive purposes of the carbon, catalyst, and/or current collector. This material is preferably chemically inert to the electrochemical environment. In certain embodiments, the binder material also has hydrophobic characteristics. Appropriate binder materials include polymers and copolymers based on polytetrafluoroethylene (e.g., Teflon® and Teflon® T-30 commercially available from E.I. du Pont Nemours and Company Corp., Wilmington, Del.), polyvinyl alcohol (PVA), poly(ethylene oxide) (PEO), polyvinylpyrrolidone (PVP), and the like, and derivatives, combinations and mixtures comprising at least one of the foregoing binder materials. However, one of skill in the art will recognize that other binder materials may be used.

The active constituent is generally a suitable catalyst material to facilitate oxygen reaction at the cathode 114. The catalyst material is generally provided in an effective amount to facilitate oxygen reaction at the cathode 114. Suitable catalyst materials include, but are not limited to: manganese, lanthanum, strontium, cobalt, platinum, and combinations and oxides comprising at least one of the foregoing catalyst materials.

To electrically isolate the anode 112 from the cathode 114, the separator 116 is provided between the electrodes. In certain embodiments of the cell 110 herein, the separator 116 is disposed in ionic contact with the anode 112 to form an electrode assembly. In other embodiments, the separator 116 is disposed in physical and ionic contact with at least a portion of at least one major surface of the anode 112 to form an electrode assembly. In still further embodiments, the separator 116 is disposed in physical and ionic contact with substantially all of one major surfaces of the anode 112 to form an electrode assembly. In still further embodiments, the separator 116 is disposed in physical and ionic contact with substantially all of two major surfaces of the anode 112 to form an electrode assembly.

The physical and ionic contact between the separator and the anode may be accomplished by: direct application of the separator 116 on one or more major surfaces of the anode 112; enveloping the anode 112 with the separator 116; use of a frame or other structure for structural support of the anode 112, wherein the separator 116 is attached to the anode 112 within the frame or other structure; or the separator 116 may be attached to a frame or other structure, wherein the anode 112 is disposed within the frame or other structure.

Separator 116 may be any commercially available separator capable of electrically isolating the anode 112 and the cathode 114, while allowing sufficient ionic transport between the anode 112 and the cathode 114. Preferably, the separator 116 is flexible, to accommodate electrochemical expansion and contraction of the cell components, and chemically inert to the cell chemicals. Suitable separators are provided in forms including, but not limited to, woven, non-woven, porous (such as microporous or nanoporous), cellular, polymer sheets, and the like. Materials for the separator include, but are not limited to, polyolefin (e.g., Gelgard® commercially available from Dow Chemical Company), polyvinyl alcohol (PVA), cellulose (e.g., nitrocellulose, cellulose acetate, and the like), polyethylene, polyamide (e.g., nylon), fluorocarbon-type resins (e.g., the Nafion® family of resins which have sulfonic acid group functionality, commercially available from du Pont), cellophane, filter paper, and combinations comprising at least one of the foregoing materials. The separator 116 may also comprise additives and/or coatings such as acrylic compounds and the like to make them more wettable and permeable to the electrolyte.

In certain embodiments, the separator comprises a membrane having electrolyte, such as hydroxide conducting electrolytes, incorporated therein. The membrane may have hydroxide conducing properties by virtue of: physical characteristics (e.g., porosity) capable of supporting a hydroxide source, such as a gelatinous alkaline material; molecular structure that supports a hydroxide source, such as an aqueous electrolyte; anion exchange properties, such as anion exchange membranes; or a combination of one or more of these characteristics capable of providing the hydroxide source.

For instance, the separator may comprise a material having physical characteristics (e.g., porosity) capable of supporting a hydroxide source, such as a gelatinous alkaline solution. For example, various separators capable of providing ionically conducting media are described in: U.S. Pat. No. 5,250,370 entitled "Variable Area Dynamic Battery," by Sadeg M. Faris, issued Oct. 5, 1993; U.S. Pat. No. 6,296,960 entitled "System and Method for Producing Electrical Power Using Metal Air Fuel Cell Battery Technology," by Sadeg M. Faris, Yuen-Ming Chang, Tsepin Tsai, and Wayne Yao, issued Oct. 2, 2001; U.S. Pat. No. 6,472,093 entitled "Metal-Air Fuel Cell Battery Systems Having A Metal-Fuel Card Storage Cartridge, Insertable Within A Fuel Cartridge Insertion Port, Containing A Supply Of Substantially Planar Discrete Metal-Fuel Cards, And Fuel Card Transport Mechanisms Therein," by Sadeg M. Faris and Tsepin Tsai, issued on Oct. 29, 2002; U.S. Pat. No. 6,299,997 entitled "Ionically-Conductive Belt Structure For Use In A Metal-Air Fuel Cell Battery System And Method Of Fabricating The Same," by Sadeg M. Paris, Tsepin Tsai, Thomas J. Legbandt, Muguo Chen, and Wayne Yao, issued on Oct. 9, 2001; U.S. Pat. No. 6,190,792 issued Feb. 20, 2001 entitled "Cathode Cylinder For Use In Metal-Air Fuel Cell Battery Systems And Method Of Fabricating The Same," by Sadeg M. Paris, Tsepin Tsai, Thomas Legbandt, Wenbin Yao, and Muguo Chen. issued on Feb. 20, 2001; U.S. Pat. No. 6,306,534 entitled "Metal-Air Fuel Cell Battery System Employing Means for Discharging and Recharging Metal-Fuel Cards," by Sadeg M. Faris, Tsepin Tsai, Wenbin Yao, and Muguo Chen, issued Oct. 23, 2001; U.S. Pat. No. 6,299,998 entitled "Movable Anode Fuel Cell Battery," by Tsepin Tsai and William Morris, issued Oct. 9, 2001; and U.S. Pat. No. 6,458,480 entitled "Movable Anode Fuel Cell Battery," by Tsepin Tsai, William F. Morris, issued on Oct. 1, 2002, all of which are herein incorporated by reference.

In general, the type of material having physical characteristics capable of supporting a hydroxide source may comprise an electrolyte gel. The electrolyte gel may be either applied directly on the surface of the evolution and/or reduction electrodes, or applied as a self supported membrane between the evolution and reduction electrodes. Alternatively, the gel may be supported by a substrate and incorporated between the evolution and reduction electrodes.

The electrolyte (either within any one of the variations of the separator herein, or as a liquid within the cell structure in general) generally comprises ion conducting material to allow ionic conduction between the metal anode and the cathode. The electrolyte generally comprises hydroxide-conducting materials such as KOH, NaOH, LiOH, RbOH, CsOH or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 40% ionic conducting materials.

The gelling agent for the membrane may be any suitable gelling agent in sufficient quantity to provide the desired consistency of the material. The gelling agent may be a crosslinked polyacrylic acid (PAA), such as the Carbopol® family of crosslinked polyacrylic acids (e.g., Carbopol® 675) available from BF Goodrich Company, Charlotte, N.C., Alcosorb® G1 commercially available from Allied Colloids Limited (West Yorkshire, GB), and potassium and sodium salts of polyacrylic acid; carboxymethyl cellulose (CMC), such as those available from Aldrich Chemical Co., Inc., Milwaukee, Wis.; hydroxypropylmethyl cellulose; gelatine; polyvinyl alcohol (PVA); poly(ethylene oxide) (PEO); polybutylvinyl alcohol (PBVA); combinations comprising at least one of the foregoing gelling agents; and the like. Generally, the gelling agent concentration is from about 0.1% to about 50% preferably about 2% to about 10%.

The optional substrate may be provided in forms including, but not limited to, woven, non-woven, porous (such as microporous or nanoporous), cellular, polymer sheets, and the like, which are capable of allowing sufficient ionic transport between the reduction and evolution electrodes. In certain embodiments, the substrate is flexible, to accommodate electrochemical expansion and contraction of the cell components, and chemically inert to the cell materials. Materials for the substrate include, but are not limited to, polyolefin (e.g., Gelgard® commercially available from Daramic Inc., Burlington, Mass.), polyvinyl alcohol (PVA), cellulose (e.g., nitrocellulose, cellulose acetate, and the like), polyamide (e.g., nylon), cellophane, filter paper, and combinations comprising at least one of the foregoing materials. The substrate may also comprise additives and/or coatings such as acrylic compounds and the like to make them more wettable and permeable to the electrolyte.

In other embodiments of a hydroxide-conducting membrane as a separator, a molecular structure is provided that supports a hydroxide source, such as an aqueous electrolyte. Such membranes are desirable in that conductivity benefits of aqueous electrolytes may be achieved in a self supported solid state structure. In certain embodiments, the membrane may be fabricated from a composite of a polymeric material and an electrolyte. The molecular structure of the polymeric material supports the electrolyte. Cross-linking and/or polymeric strands serve to maintain the electrolyte.

In one example of a conductive separator, a polymeric material such as polyvinyl chloride (PVC) or poly(ethylene oxide) (PEO) is formed integrally with a hydroxide source as a thick film. In a first formulation, one mole of KOH and 0.1 mole of calcium chloride are dissolved in a mixed solution of 60 milliliters of water and 40 milliliters of tetrahydrogen furan (THF). Calcium chloride is provided as a hygroscopic agent. Thereafter, one mole of PEO is added to the mixture. In a second formulation, the same materials for the first formula are used, with the substitution of PVC for PEO. The solution is cast (or coated) as a thick film onto substrate, such as polyvinyl alcohol (PVA) type plastic material. Other substrate materials preferably having a surface tension higher than the film material may be used. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulations, it is possible to form ionically-conductive films having a thickness in the range of about 0.2 to about 0.5 millimeters.

Other embodiments of conductive membranes suitable as a separator are described in greater detail in: U.S. Pat. No. 6,605,391, entitled "Solid Gel Membrane", by Muguo Chen, Tsepin Tsai, Wayne Yao, Yuen-Ming Chang, Lin-Feng Li, and Tom Karen, issued on Aug. 12, 2003; U.S. Pat. No. 6,358,651 entitled "Solid Gel Membrane Separator in Rechargeable Electrochemical Cells", by Muguo Chen, Tsepin Tsai and Lin-Feng Li, issued Mar. 19, 2002; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties.

In certain embodiments, the polymeric material used as separator comprises a polymerization product of one or more monomers selected from the group of water soluble ethylenically unsaturated amides and acids, and optionally a water soluble or water swellable polymer. The polymerized product may be formed on a support material or substrate. The support material or substrate may be, but not limited to, a woven or nonwoven fabric, such as a polyolefin, polyvinyl alcohol, cellulose, or a polyamide, such as nylon.

The electrolyte may be added prior to polymerization of the above monomer(s), or after polymerization. For example, in one embodiment, electrolyte may be added to a solution containing the monomer(s), an optional polymerization initiator, and an optional reinforcing element prior to polymerization, and it remains embedded in the polymeric material after the polymerization. Alternatively, the polymerization may be effectuated without the electrolyte, wherein the electrolyte is subsequently included.

The water soluble ethylenically unsaturated amide and acid monomers may include methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, and the sodium salt of vinylsulfonic acid, other water soluble ethylenically unsaturated amide and acid monomers, or combinations comprising at least one of the foregoing monomers.

The water soluble or water swellable polymer, which acts as a reinforcing element, may include polysulfone (anionic), poly(sodium 4-styrenesulfonate), carboxymethyl cellulose, sodium salt of poly(styrenesulfonic acid-co-maleic acid), corn starch, any other water-soluble or water-swellable polymers, or combinations comprising at least one of the foregoing water soluble or water swellable polymers. The addition of the reinforcing element enhances mechanical strength of the polymer structure.

Optionally, a crosslinking agent, such as methylenebisacrylamide, ethylenebisacrylamide, any water-soluble N,N'-alkylidene-bis(ethylenically unsaturated amide), other crosslinkers, or combinations comprising at least one of the foregoing crosslinking agents.

A polymerization initiator may also be included, such as ammonium persulfate, alkali metal persulfates and peroxides, other initiators, or combinations comprising at least one of the foregoing initiators. Further, an initiator may be used in combination with radical generating methods such as radiation, including for example, ultraviolet light, X-ray, γ-ray, and the like. However, the chemical initiators need not be added if the radiation alone is sufficiently powerful to begin the polymerization.

In one method of forming the polymeric material, the selected fabric may be soaked in the monomer solution (with or without the ionic species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the ionic species is included in the polymerized solution, the hydroxide ion (or other ions) remains in solution after the polymerization. Further, when the polymeric material does not include the ionic species, it may be added by, for example, soaking the polymeric material in an ionic solution.

Polymerization is generally carried out at a temperature ranging from room temperature to about 130° C., but preferably at an elevated temperature ranging from about 75° to about 100° C. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma-rays, x-rays, electron beam, or a combination thereof.

To control the thickness of the membrane, the coated fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high.

In still further embodiments of the separator, anion exchange membranes are employed. Some exemplary anion exchange membranes are based on organic polymers comprising a quaternary ammonium salt structure functionality; strong base polystyrene divinylbenzene cross-linked Type I anion exchangers; weak base polystyrene divinylbenzene cross-linked anion exhangers; strong base/weak base polystyrene divinylbenzene cross-linked Type II anion exchangers; strong base/weak base acrylic anion exchangers; strong base perfluoro aminated anion exchangers; naturally occurring anion exchangers such as certain clays; and combinations and blends comprising at least one of the foregoing materials. An exemplary anion exchange material is described in greater detail in U.S. Provisional Patent Application No. 60/307,312 entitled "Anion Exchange Material", by Muguo Chen and Robert Callahan, filed on Jul. 23, 2001, and incorporated by reference herein.

Another example of a suitable anion exchange membrane is described in greater detail in U.S. Pat. No. 6,183,914 and incorporated by reference herein. The membrane includes an ammonium-based polymer comprising (a) an organic polymer having an alkyl quaternary ammonium salt structure; (b) a nitrogen-containing, heterocyclic ammonium salt; and (c) a source of hydroxide anion.

In yet another embodiment, mechanical strength of the resulting membrane may be increased by casting the composition on a support material or substrate, which is preferably a woven or nonwoven fabric, such as a polyolefin, polyester, polyvinyl alcohol, cellulose, or a polyamide, such as nylon.

Referring now to FIG. 1B, the electrochemical cell 110 is shown having the electrodes in ionic isolation. Alternatively, the electrochemical cell 110 may be configured so that the selective reduction of ionic conductivity between the electrodes is attainable. The ionic isolation or conductivity reduction between the anode 112 and the cathode 114 may be effectuated by mechanical displacement of one or both of the electrodes, or insertion of an ionic isolating or ionic conductivity reducing structure or material between the electrodes, or both by mechanical displacement of one or both of the electrodes and insertion of tonight isolating or ionic conductivity reducing structure or material between the electrodes.

In certain embodiments, the isolation is effectuated by mechanical displacement of the anode 112, the cathode 114, or both the anode 112 and the cathode 114. For example, a suitable displacement structure may be attached to the anode 112 or the cathode 114. Further, a suitable displacement structure or structures may be attached or bonded the anode 112 and the cathode 114. Additionally, a suitable displacement structure may be provided on the anode and an additional housing or support structure. Still further, a suitable displacement structure may be provided on the cathode and an additional housing or support structure.

In other embodiments, ionic isolation or conductivity reduction may be effectuated by insertion of an ionic isolating structure or material between the electrodes. For example, a suitable plastic barrier may be inserted between the electrodes for ionic isolation. Optionally, this barrier may have another function of maintaining pressure on the anode 112, the cathode 114, or both. This is particularly desirable when expansion of one or both of the electrodes occurs. For example, zinc based anode materials may self-discharge, thus expanding. Without a suitable barrier, the expansion may detrimentally effect other parts of the cell. However, with a suitable barrier, an opposing force of the barrier serves to minimize or prevent expansion of the anode. Further, a suitable barrier may also serve to prevent leeching of component constituents, for example, leeching of catalyst materials from the cathode 114 to the anode 112.

In still further embodiments, both a displacement structure (for mechanical displacement of the anode 112, the cathode 114, or both the anode 112) and ionic isolating structure (e.g., a barrier between the anode 112 and the cathode 114) may be employed.

FIG. 1B shows that the separator 110 is attached to the anode 116, such that when ionic isolation is effectuated, the separator 116 remains attached to the anode 112. However, the separator 116 may be attached to the cathode 114. Further, one or more separators may be attached to both the anode and the cathode.

Figure 2A:
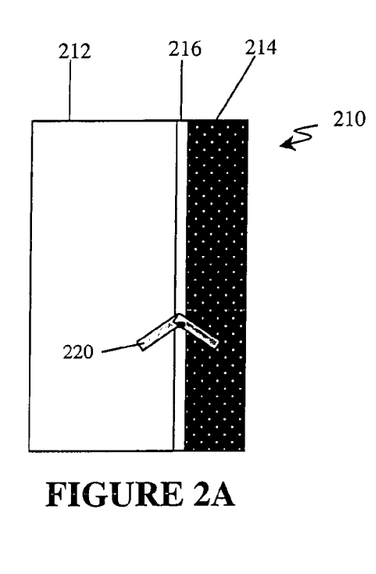
FIGS. 2A and 2B depict one embodiment of a structure for effectuating ionic isolation.
Figure 2B:
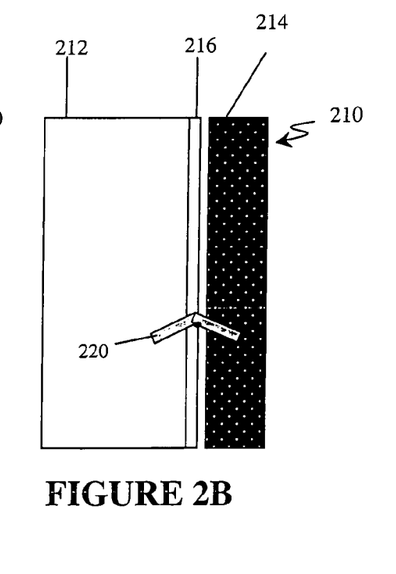

FIGS. 2A and 2B depict one example of a displacement structure. A hinge 220 is provided to allow for mechanical cooperation of an anode 212 and a cathode 214. The hinge 220 may be secured directly to the cathode 214 and the anode 212, or, alternatively, the anode 212 and/or the cathode 214 may be provided within suitable housing structures, whereupon the hinge 220 maybe secured to the one or more housing structures. The hinge may be constructed of any suitable material, preferably non-reactive (with respect to the cell electrochemistry), including but not limited to steel, brass, nickel, plastic, or carbon composite. The hinge may be an arm hinge, having a bending elbow or pivot portion that allows displacement, as shown in FIGS. 2A and 2B.

Upon selective activation, the hinge 220 may be displaced to allow ionic isolation between the anode 212 and the cathode 214. The mechanical force to displace the hinge 220 may be provided manually or automatically. Suitable structures may be provided (not shown) to facilitate displacement of the hinge 220, such as levers, springs, actuators, cams, etc. Additionally, electronic control may be incorporated. Such electronic control may be, for example, activated up on signal from an energy consuming device. For example, in a vehicle, upon actuation of the vehicle, a secondary power source (i.e., suitable to provide the actuating force) drives a displacement system to displace hinge 220 and allow ionic communication between the anode 212 and the cathode 214. Accordingly, when the vehicle is shut off, the system may be reversed whereby ionic isolation between the anode 212 and the cathode 214 is effectuated.

Figure 3A:
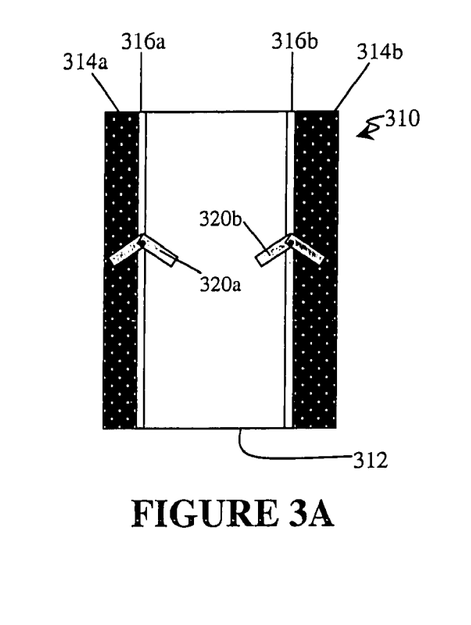
FIGS. 3A and 3B depict another embodiment of a structure for effectuating ionic isolation.
Figure 3B:
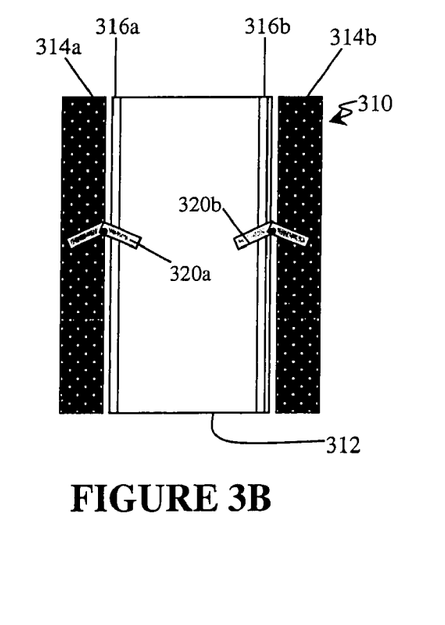

Referring now to FIGS. 3A and 3B, an electrochemical cell system 310 is depicted. System 310 is generally a monopolar configuration, having one anode 312 and a pair of cathodes 314a and 314b. To allow for ionic isolation between the anode 312 and both cathodes 314a and 314b, a pair of hinges 320a and 320b are secured to the anode 312 and the cathodes 314a and 314b, respectively. The system operates similar to that described above with respect to FIGS. 2A and 2B.

Figure 4:
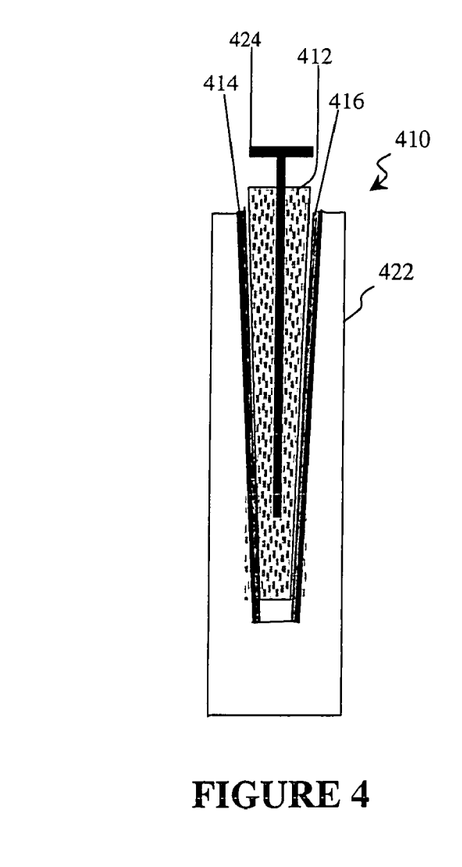
FIG. 4 depicts an embodiment of a cell structure facilitating ionic isolation.

Referring now to FIG. 4, a structure 422 is provided to house components of a cell 410, including an anode 412 and a pair of cathodes 414. Such a structure is described in further detail in U.S. patent application Ser. No. 10/074,873 filed on Feb. 11, 2002 entitled "Anode Structure for Metal Air Electrochemical Cells and Method of Manufacture Thereof" by George Tzeng, which is incorporated by reference in its entirety herein. Preferably, the cathode 414 is supported by the inside surface of the wedge-shaped compartment created by the structures 422. The anode 412 comprises a current collector 424 that also functions as a handle to remove and insert the anode 412. The handle is used to pull out the anode 412 a sufficient distance to allow ionic isolation or conductivity reduction between the anode 412 and the cathodes 414. The separator 416 may be disposed on the anode, the cathode, or both the anode and the cathode (wherein a pair of separators are used). Further, the separator 416 may be a separate layer. The structure 422 and other accompanying parts, may be formed of any suitable material that is can impart the necessary structural integrity, and can withstand the electrochemical environment, including the electrolyte and the thermal limits. Suitable materials include, but are not limited to, acrylonitrile butadiene styrene polymer, polyvinyl chloride, epoxy glass, fluorocarbons, polycarbonate, the like, and combinations comprising at least one of the foregoing material.

Figure 5:
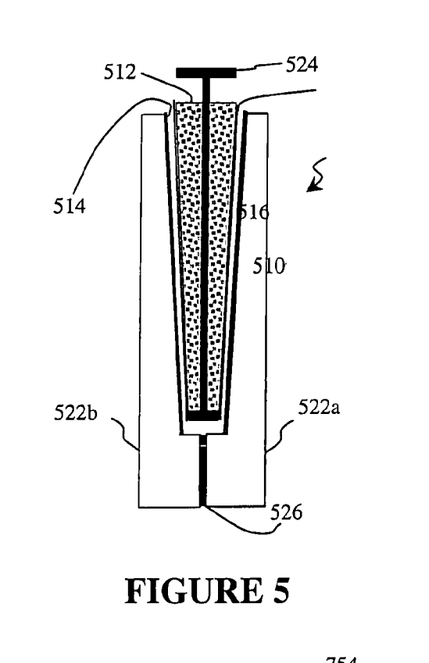
FIG. 5 depicts another embodiment of a cell structure facilitating ionic isolation.

Referring now to FIG. 5 structures 522a and 522b are provided to house components of a cell 510, including an anode 512 and a cathode 514. Preferably, the cathode 514 is supported by a surface of the compartment created by structures 522a and 522b. A separator 516 is generally provided between the anode 512 and the cathode 514. The anode 512 comprises a current collector 524 that also optionally functions as a handle to remove and insert the anode 512 and allow for ionic isolation or continuing reduction as described with respect to FIG. 4. The separator 516 may be disposed on the anode, the cathode, or both the anode and cathode (wherein a pair of separators are used).

The structures 522a and 522b are separable, or alternatively, are connected together and configured to be expandable. The structures 522a and 522b may be configured as a cathode frame which is capable of expanding to, for example, minimize or prevent ionic communication between the anode 512 and the cathode 514, and insert and remove the anode. Further, structures 522a and 522b may be configured as a cathode frame which is capable of contracting to provide pressure to increase contact between the anode and the cathode during cell discharging operations. A resilient portion 526 is provided between the structure 522a and 522b. The resilient portion 526 may comprise an elastomeric material such as rubber. The resilient portion 526 generally allows for expansion and contraction of the cell components for anode replacement. Further, when structures 522a and 522b of a first cell is expanded, the resilient portion 526 may be dimensioned, positioned and configured to prevent electrolyte from leaking from the cell 510. The resilient portion also may be dimensioned, positioned and configured to allow for cell expansion when the volume of the components therein, particularly the anode, increases.

During insertion of the anode 512 into the compartment formed by the structures 522a and 522b, clearance is provided between the anode 512 and the cathode 514 by separating or expanding the structures 522a and 522b. When the anode is fully inserted, the structures 522a and 522b may be closed to eliminate or minimize the clearance between the cathode 514 and the anode 512 and allow for the electrochemical reaction to occur.

Figure 6:
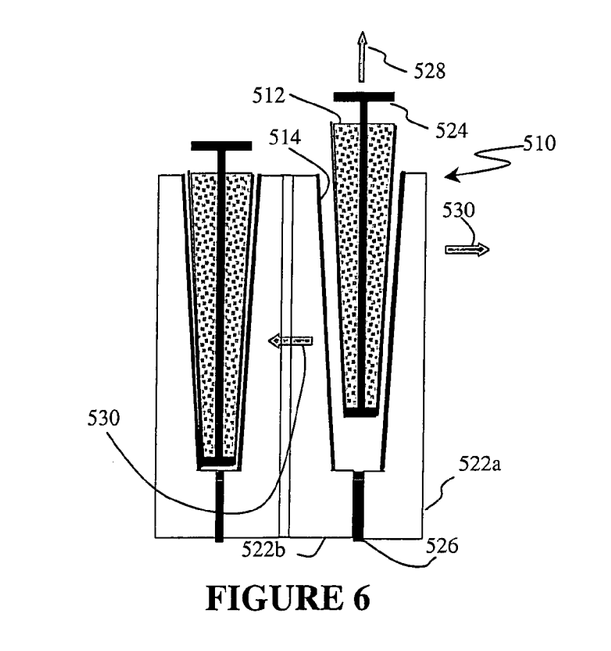
FIG. 6 illustrates effectuating ionic isolation in the cell structure shown in FIG. 5.

Referring now to FIG. 6 removal of the anode 512 from structures 522a and 522b is shown. The structures 522a and 522b are separated (indicated by arrows 530), and the resilient portions 526 stretches. This minimized or eliminates electrochemical reaction between the between the electrodes, and also provides the clearance between the anode 512 and the cathode 514 to remove the anode 512 (indicated by arrow 528) from the cell 510 without damaging the cathode 514.

Figure 7:
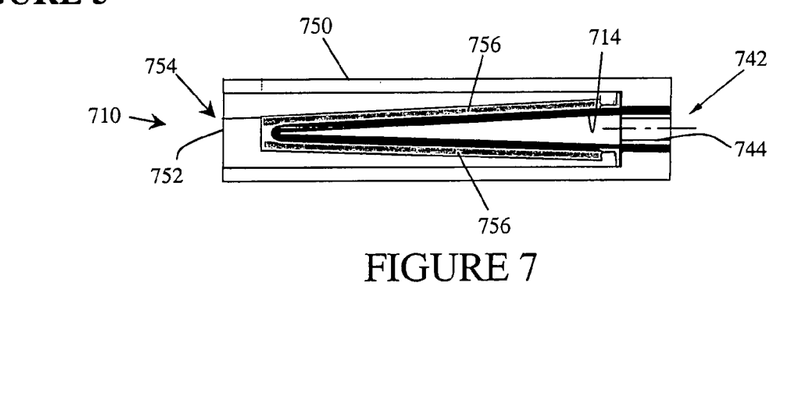
FIG. 7 depicts another embodiment of a cell structure facilitating ionic isolation.

Referring now to FIG. 7, a cathode 714 of a metal air electrochemical cell 710 is supported by a wedge shaped structure (not shown). Such a system is described in further detail in U.S. patent application Ser. No. 10/074,893 filed on Feb. 11, 2002 entitled "Metal Air Cell System" by George Tzeng, which is incorporated by reference in its entirety herein. An air channel opening 742 is provided on the wide end of the wedge structure to provide air or oxygen circulation into an air channel 744 generally leading to the active regions of the cathode. The cathode 714 is wrapped around the wedge structure to form a wedge cathode structure. The wedge cathode structure is inserted into a case 750. The case 750 generally is enclosed with one end having the air channel and one open end 752. The open end 752 allows for insertion of and anode cartridge, as described further herein. The case 750 serves to protect the cathode 714 and also to prevent the user to contact the cathode 714 and electrolyte.

A fuel cartridge 754 for the metal air cell 710 comprises a pair of anode portions 756. The anode portions 756 are formed or disposed on inside surfaces of the cavity within the cartridge 754. The angle between these two anode portions 756 is preferably close to the angle of the wedge structure and more preferably the angle between these two anode portions 756 is identical to the angle of the wedge structure 740. To allow for ionic isolation or ionic conductivity reduction between the cathode 714 and the anode and portion 756, the cathode structure is removed or partially removed from the fuel cartridges 754. This can be done by various mechanical means, such as pulling, squeezing followed by pulling, and the like. Further, the removal may be by an automated system, for example, connected to a plurality of cells 710.

Figure 8A:
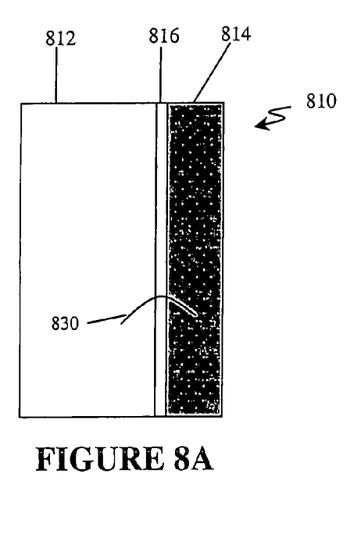
FIGS. 8A and 8B depict a further embodiment of a structure for effectuating ionic isolation.
Figures 8B, 9A:
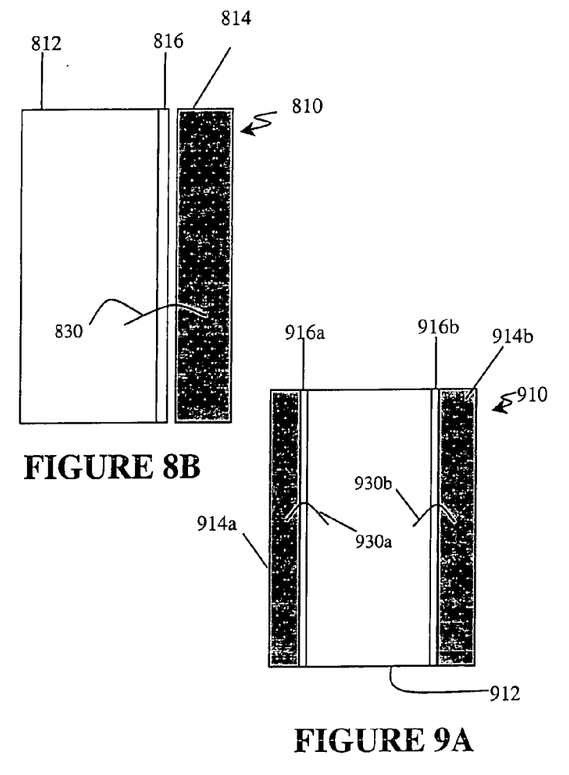
FIGS. 9A and 9B depict still another embodiment of a structure for effectuating ionic isolation.

FIGS. 8A and 8B depict another example of a displacement structure. A shape memory alloy hinge 830 is provided to allow for mechanical cooperation of an anode 812 and the cathode 814. The shape memory alloy hinge 830 may be secured directly to the cathode 814 and the anode 812, or, alternatively, the anode 812 and/or the cathode 814 may be provided within suitable housing structures, whereupon the shape memory alloy hinge 830 may be secured to the one or more housing structures. Upon selective activation, the shape memory alloy hinge 830 may be altered, i.e., the shape thereof changed, to allow for isolation between the anode 812 and the cathode 814. Note that although only one shape memory alloy hinge 830 is depicted, a plurality of shape memory ally hinges may be employed. The shape memory alloy hinge 830 may be, for example, a wire, tube, or plate, formed of shape memory alloy material. These materials demonstrate the ability to return to a previously defined shape and/or size when subjected to an appropriate thermal procedure. These materials may include, for example, nickel-titanium alloys and copper-based alloys such as copper-zinc-aluminum and copper-aluminum-nickel.

Shape memory alloy materials are known, and have been in use for decades. Shape memory alloys are alloys which undergo a crystalline phase transition upon applied temperature and/or stress variations. In normal conditions, the transition from a shape memory alloy's high temperature state, austenite, to its low temperature state, martensite, occurs over a temperature range which varies with the composition of the alloy, itself, and the type of thermal-mechanical processing by which it was manufactured.

When stress is applied to a shape memory alloy member while in the austenite phase, and the member is cooled through the austenite to martensite transition temperature range, the austenite phase transforms to the martensite phase, and the shape of the shape memory alloy member is altered due to the applied stress. Upon the application of heat, the shape memory alloy member returns to its original shape when it transitions from the martensite phase to the austenite phase.

In general, shape memory alloys can be categorized into two classes: one-way and two-way. Upon heating to a specific temperature range, one-way shape memory alloys recover a predefined shape, which is predefined with suitable heating steps. One-way shape memory alloys do not returned to the original shape upon cooling. Two-way shape memory alloys, on the other hand, return to the preheated shape after cooling. Further detail regarding shape memory alloys is known, for example, is described in "Shape Memory Alloys" by Darel E. Hodgeskin, Ming H. Wu, and Robert J. Biermann[1].

[1] http://www.sma-inc.com/SMA.Paper.html

Accordingly, the material of the shape memory alloy hinge 830 should be selected so that unwanted shape memory alloy change does not take place. The internal temperature of the cell should not rise to level that will cause the shape memory alloy to undergo change. Alternatively, this internal temperature can be used as a mechanism to purposely induce shape change of the shape memory alloy. This may be useful, for example, as a safety device to prevent overheating of the cell.

Generally, to provide controlled ionic isolation between the anode 812 and the cathode 814, a heating system is employed (not shown). A heating system may include one or more electric heaters proximate to the shape memory alloy. Alternatively, electric current may be passed through the shape memory alloy to heat it to the desired temperature.

Note that to prevent electrical shorting, one or both ends of the shape memory alloy hinge 830 should be secured to an insulator upon the appropriate electrode.

With a one-way shape memory alloy change 830, when the alloy is heated to change shape (i.e., as shown generally from FIG. 8A to the position in FIG. 8B), the shape memory alloy generally will not return back to the original configuration (i.e., the configuration of FIG. 8A, and the configuration of the shape memory alloy wherein upon heating it expands to the configuration in FIG. 8B). Therefore, an external force must be provided to return the electrodes into ionic contact, which would accordingly return the shape memory alloy hinge 830 to the position before heating. This force may be provided manually, with springs, with other shape memory alloy actuators, or with a variety of other mechanical apparatus. Further, this may be an automated system, whereby an electronic controller determines the need to revert to the original position and subsequently provides a signal for the mechanical force.

With the two-way shape memory alloy hinge 830, the heat that is utilized to transform the shape of the hinge 830 must be maintained in order to maintain the shape. When the heat is removed, the shape memory alloy hinge 830 reverts back to the shape of the unheated hinge 830.

Note that with either the one-way or two-way shape memory alloys, the preheated and heated shapes may be associated with different positions of the configurations shown in FIGS. 8A and 8B. For instance, and in one configuration, the preheated shape of the shape memory alloy hinge 830 may be as depicted in FIG. 8A, and the heated shape depicted in FIG. 8B. Alternatively, the preheated shape may be as depicted in FIG. 8B, and the heated shape may be as depicted in FIG. 8A. In this embodiment, for instance with a two-way shape memory alloy, the power to provide the heat to the shape memory alloy hinge 830 to maintain in the position of ionic contact may be derived from the cell 810 itself.

Figure 9B:
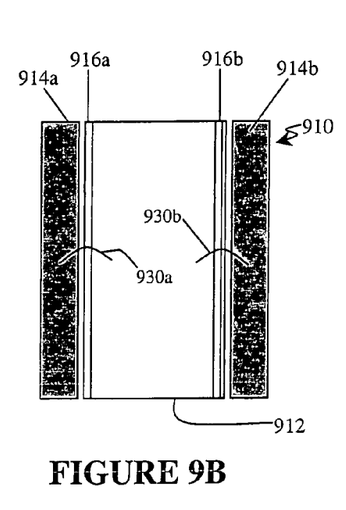

Referring now to FIGS. 9A and 9B, an electrochemical cell system 910 is depicted. System 910 is generally in a monopolar configuration, having one anode 912 and a pair of cathodes 914b and 914b. To allow for ionic isolation between the anode 912 and both cathodes 914a and 914b, or to allow for selective reduction of ionic conductivity, a pair of shape memory alloy hinges 930a and 930b are attached to (indirectly or directly) to the anode 912 and the cathodes 914a and 914b respectively. The system operates similar to that described above with respect to FIGS. 8A and 8B. Note that in a monopolar configuration, the system may operate such that only one of the cathodes 914a or 914b are isolated, or have ionic conductivity between the selected cathode and the anode 912 reduced. This may afford greater flexibility, for example, in controlling the output of the system 910 and optimizing the usage of the metal fuel of the anode 912.

Figures 10A, 10B, 11A, 11B:
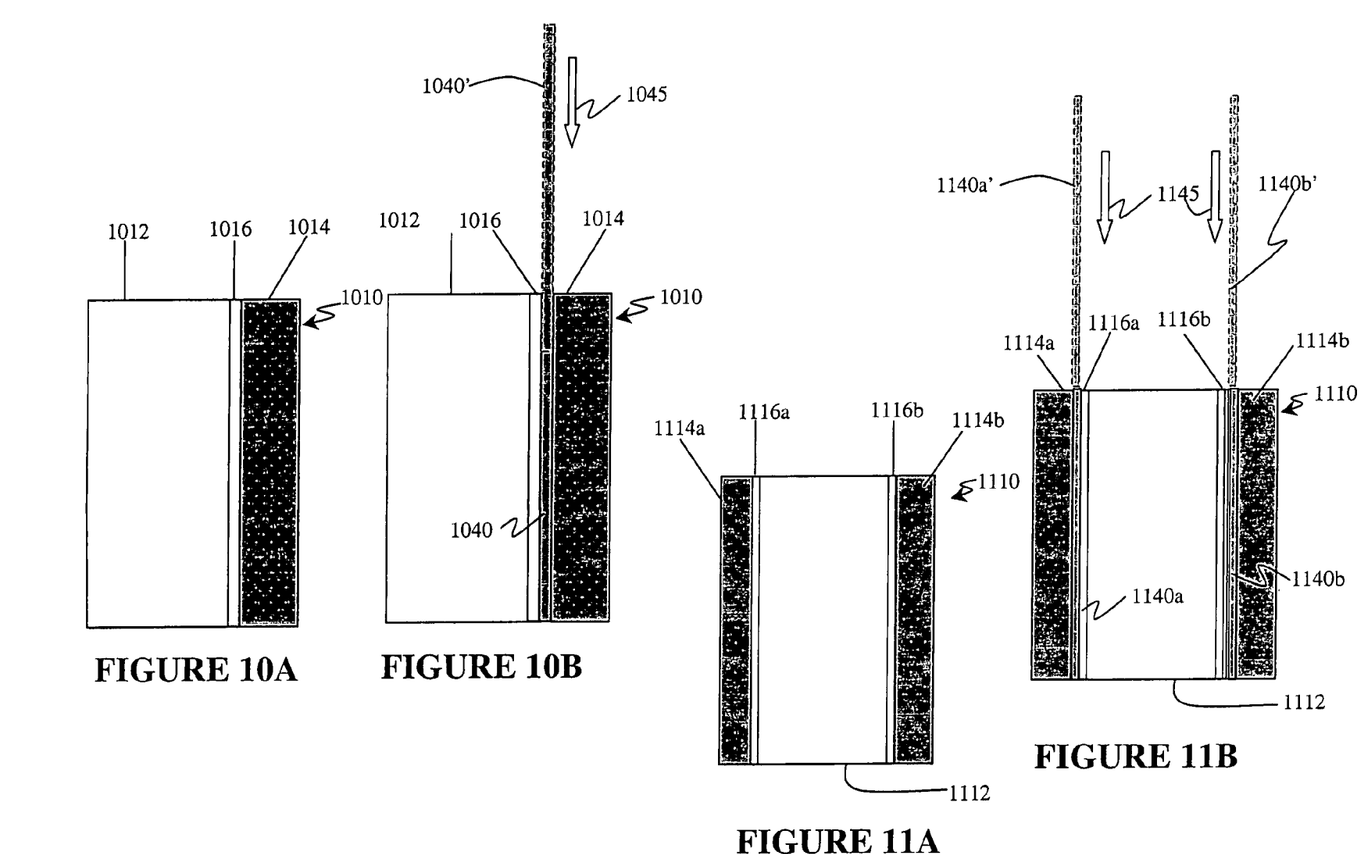
FIGS. 10A and 10B depict one embodiment of a structure and system for inserting an ionic barrier.
FIGS. 11A and 11B depict another embodiment of a structure and system for inserting an ionic barrier.

Referring now to FIGS. 10A and 10B, an electrochemical cell system 1010 is depicted. The system 1010 is provided with a barrier 1040 to provide ionic isolation or conductivity reduction between an anode 1012 and the cathode 1014, which are maintained electrical isolation with a separator 1016. Therefore, to ionically isolate the electrodes, the barrier 1040' is inserted in a direction indicated by arrow 1045 between the anode 1012 and the cathode 1010. Note that although the figure depicts the anode and any separator adjoining when the barrier 1040 is in place, it is understood that the separator 1016 and the cathode 1014 may be adjoined when the barrier 1040 is in place. Further, an additional separator they be provided, such that when the barrier 1040 is in place, both the anode 1012 and the cathode 1014 are adjoined to a separator.

In order to insert the barrier 1040, several alternatives systems may be employed. For example, the anode 1012 and the cathode 1014 may be displaced as described above with respect to FIGS. 1–9. In this manner, the electrodes are displaced, and the barrier 1040 is inserted. To maintain pressure on one or both of the electrodes, the displacement structure utilized to separate the electrodes may be further utilized to compress the barrier 1040 between the electrodes. Alternatively, the barrier 1040 may be forced to between the electrodes 1012 and 1014. In this manner, the electrodes are configured such that in insertion force (i.e., the force of inserting the barrier 1040 between the electrodes) should be sufficient to displace the electrodes and allow the barrier 1040 to enter therebetween. In still another embodiment, both a displacement structure such as described in FIGS. 1–9, and an insertion force, may be employed to insert the barrier 1040.

FIGS. 11A and 11B depicted a similar structure as in FIGS. 10A and 10B, wherein the electrochemical cell 1110 is in a monopolar configuration.

Figure 12A:
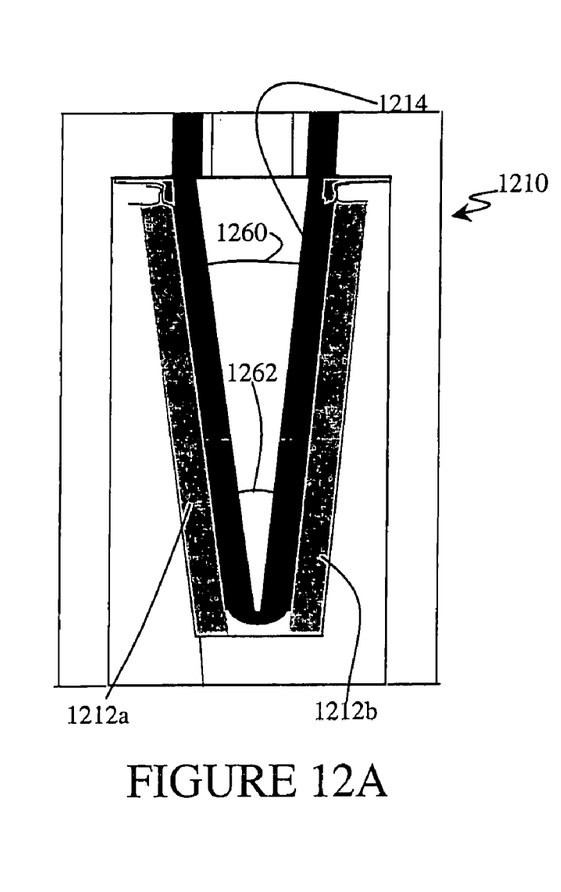
FIGS. 12A–12D depict an embodiment of a system for effectuating ionic isolation and inserting an ionic barrier.
Figure 12B:
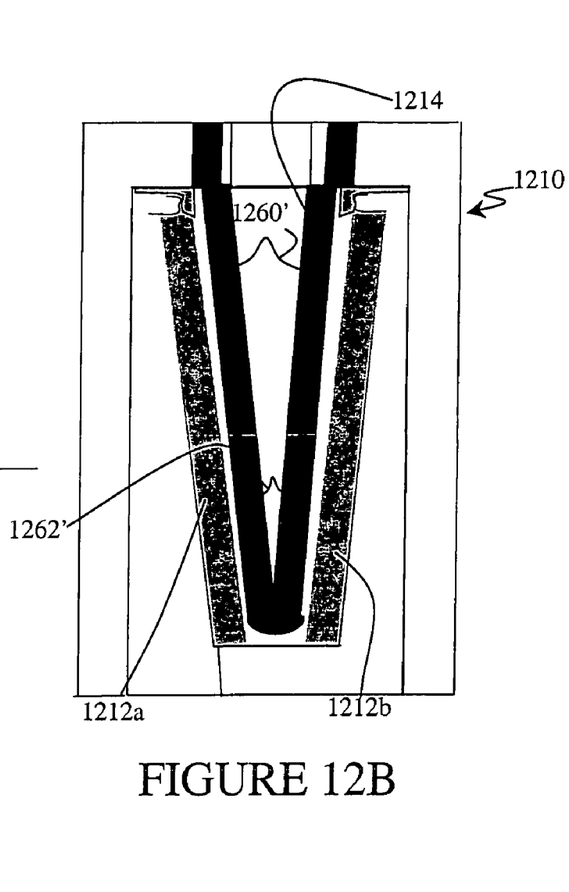
Figure 12C:
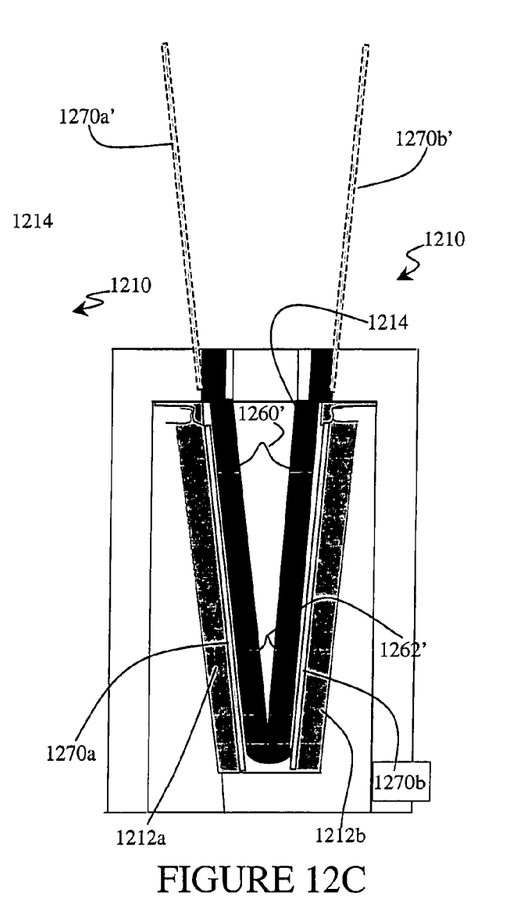
Figure 12D:
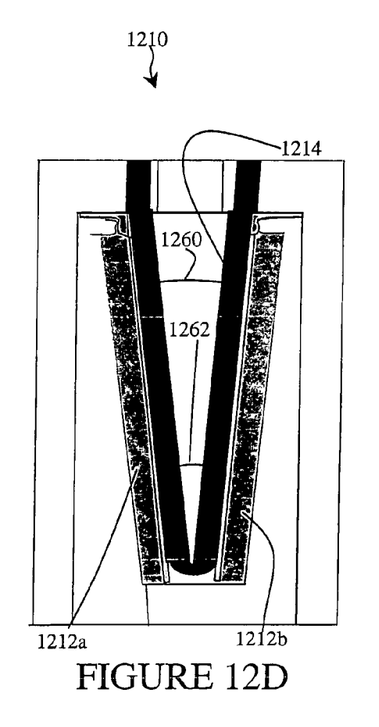
Figures 13A, 13B, 13C:
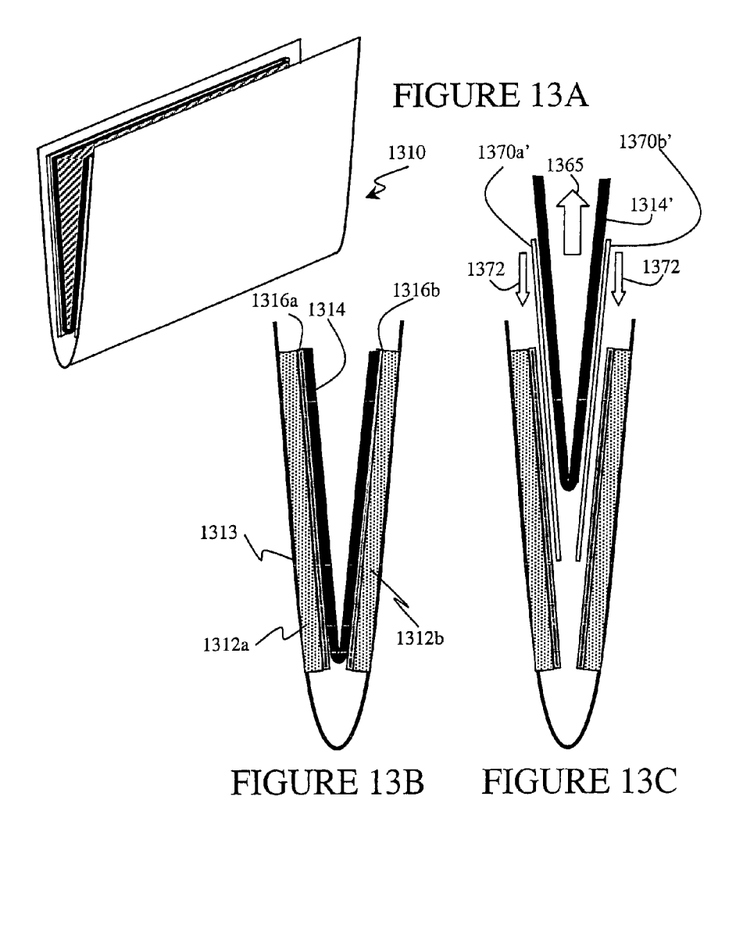
FIGS. 13A–13E depict another embodiment of a system for effectuating ionic isolation and inserting an ionic barrier.
Figure 13D:
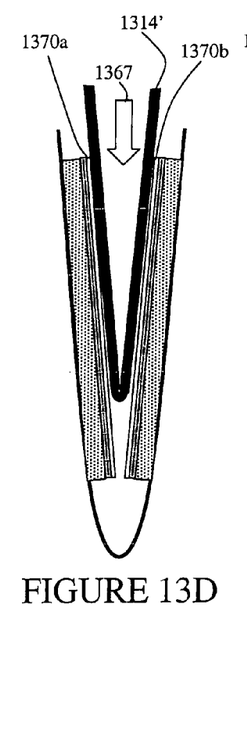
Figure 13E:
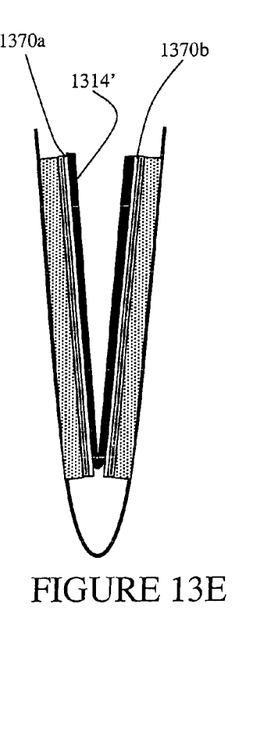

Referring now to FIGS. 12A through 12D, a system and method having ionic isolation capability is schematically depicted. The electrochemical cell system 1210, generally similar in configuration to the cell 710 depicted in FIG. 7, includes a wedge shaped cathode 1214. The cathode 1214 is provided between a pair of anode portions 1212a and 1212b. In general, the cathode structure 1214 may be removed from the anode portions 1212a and 1212b, for example, by gently squeezing and pulling the cathode 1214 upwardly (manually or via a suitable mechanical apparatus). Therefore, when the cathode 1214 is physically separated from the anode portions 1212a and 1212b, as depicted in FIG. 12B, a pair of barriers 1270a' and 1270b' may be inserted between the cathode 1214 and the anode portions 12a and 1212b. The ionically isolated structure is shown in FIG. 12D, including barriers 1270a and 1270b ionically isolating the electrodes.

As an alternative to squeezing and pulling the cathode 1214, a pair of shape memory alloy members 1260 and 1262 may be provided on the inside region of the wedge structure of the cathode 1214. When the cell is in the active state, and does not include the barriers 1270a and 1270b, the cell 1210 is configured as depicted in FIG. 12A, with the shape memory alloy members 1260 and 1262 an extended position. To achieve ionic isolation between the cathode 1214 and the anode portions 1212a and 1212b, the shape memory alloy members 1260 and 1262 are retracted, as indicated in FIG. 12B as reference numerals 1260' and 1262'. Referring now to FIG. 12C, the physical and ionic isolation of the cathode 1214 and anode portions 1212a and 1212b facilitates insertion of barriers 1270a and 1270b, shown in FIGS. 12C and 12D.

Referring to FIGS. 13A through 13E, for example a structure that facilitates insertion of ionic barriers is depicted. The structure includes a wedge shaped cathode 314 in electrical isolation but ionic communication with a pair of anode portions 1312a and 1312b via separators 1316a and 1316b. The anode portions 1312a and 1312b are supported on a current collector structure 1313. To facilitate insertion of a pair of barriers 1370a and 1370b (indicating in the out-of-contact position in FIG. 13C as reference numerals 1370a' and 1370b', and further wherein the removed cathode is referred to as referenced numeral 1314'). The cathode 1314' is removed as indicated by the direction of arrow 1365. Thereafter, the barriers 1370a and 1370b are inserted between the cathode 1314 and the anode portions 1312a and 1312b, generally in the direction indicated by arrows 1372. When the barriers 1370a and 1370b are in place, the cathode 1314' may be reinserted in the direction indicated by arrows 1367. Note that, although the structure depicts removal and reinsertion of the cathode 1314 to physically isolate the cathode and the anode, it is understood that other configurations may be used, for example, as depicted in one embodiment in FIGS. 12A–12B, using, for example, one or more shape memory alloy members. Further, although the figures indicate that the separator 1316a and 1316b remain in contact with anode portions 1312a and 1312b, is understood that the separator may remain in contact with the cathode 1314 when removed. Alternatively, separators may be employed on both the anode and the cathode.

Another method and system of ionically isolating electrodes of an electrochemical cell includes the use of a movable ionic barrier. In one embodiment, to minimize overall volume of the electrochemical cell system, the movable barrier may be positioned between a pair of reels. For example, these reels may operate similarly to window shade rollers, whereby a force such as a tugging forcing causes retraction of a portion of a barrier stretched between electrodes. Alternatively, motorized systems may be employed. Further, shape memory alloys may be used to provide the action of moving the ionic barrier from an extended to a retracted position.

Figures 14A, 14B, 14C, 14D, 14E:
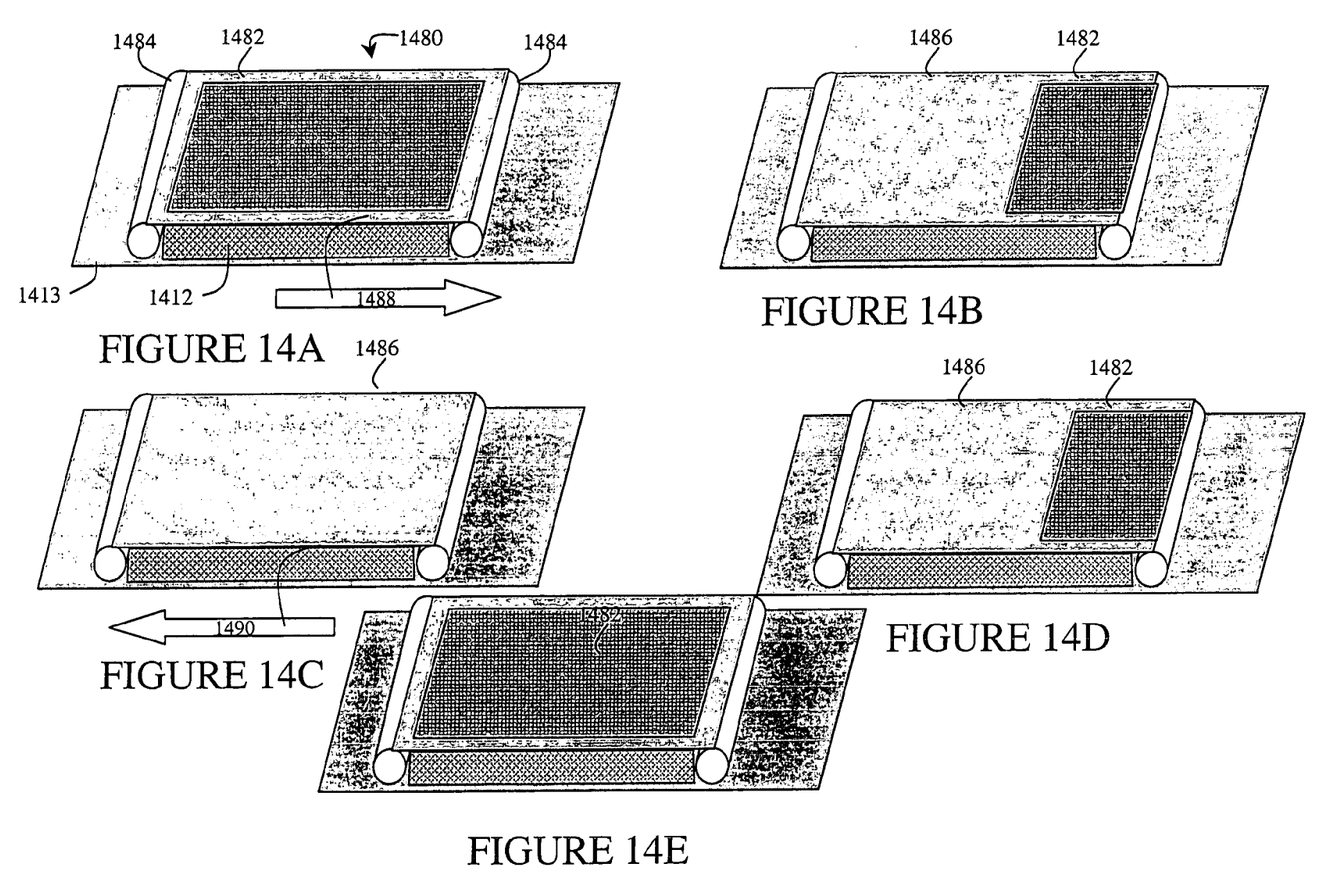
FIGS. 14A–14E depict an embodiment of an ionic barrier system.

Referring now to FIGS. 14A through 14E, an ionic barrier system 1480 is depicted. The barrier system 1480 includes, in one configuration thereof, a frame portion 1482 exposing an anode 1412, which is supported on a current collector 1413. The barrier system 1480 has opposing ends, each end including a reel 1484. When the portion 1482 is caused to move in the direction indicated by arrow 1488, an ionic barrier 1486 is exposed (FIGS. 14B and 14C). In this configuration, when the cathode (not shown) is configured on the opposite side of the barrier 1486, no electrochemical reaction will occur. To resume electrochemical reaction, the barrier 1486 is caused to move the direction indicated by arrow 1490 (the action of which is shown in FIGS. 14C and 14D) to re-expose the anode 1412 through the frame 1482.

As discussed above, the motion of the ionic isolation system 1480 may be effectuated by a variety of methods. For example, the entire barrier and open frame portion may be supported on a pair of rails that extend across the pair of reels 1484. That is, the rails may generally extends along the top and bottom (as oriented in the Figures) of the system 1480, wherein the rail is supporting the frame portion 1482 in one configuration (i.e., allowing ionic communication), and the barrier 1486 in an isolating configuration. Therefore, a default position for the shape memory alloy can be set (which may either be exposing the anode or isolating the anode). Upon application of heat, for example, generally in the vicinity of the reel 1484 having the rail portions, the rail portions will change shape to allow movement of the barrier (either to isolate the electrodes or to allow communication between the electrodes). Of course, other alternatives systems may be used, for example, using a single rail of shape memory alloy, using a sheet of shape memory alloy, or other shape memory alloy systems. In still further embodiments, the reels 1484 may operate similar to window shades. Further, the reels 1484 may include motors to allow take-out and extension of the ionic barrier 1486.

Figures 15A, 15B, 16A, 16B:
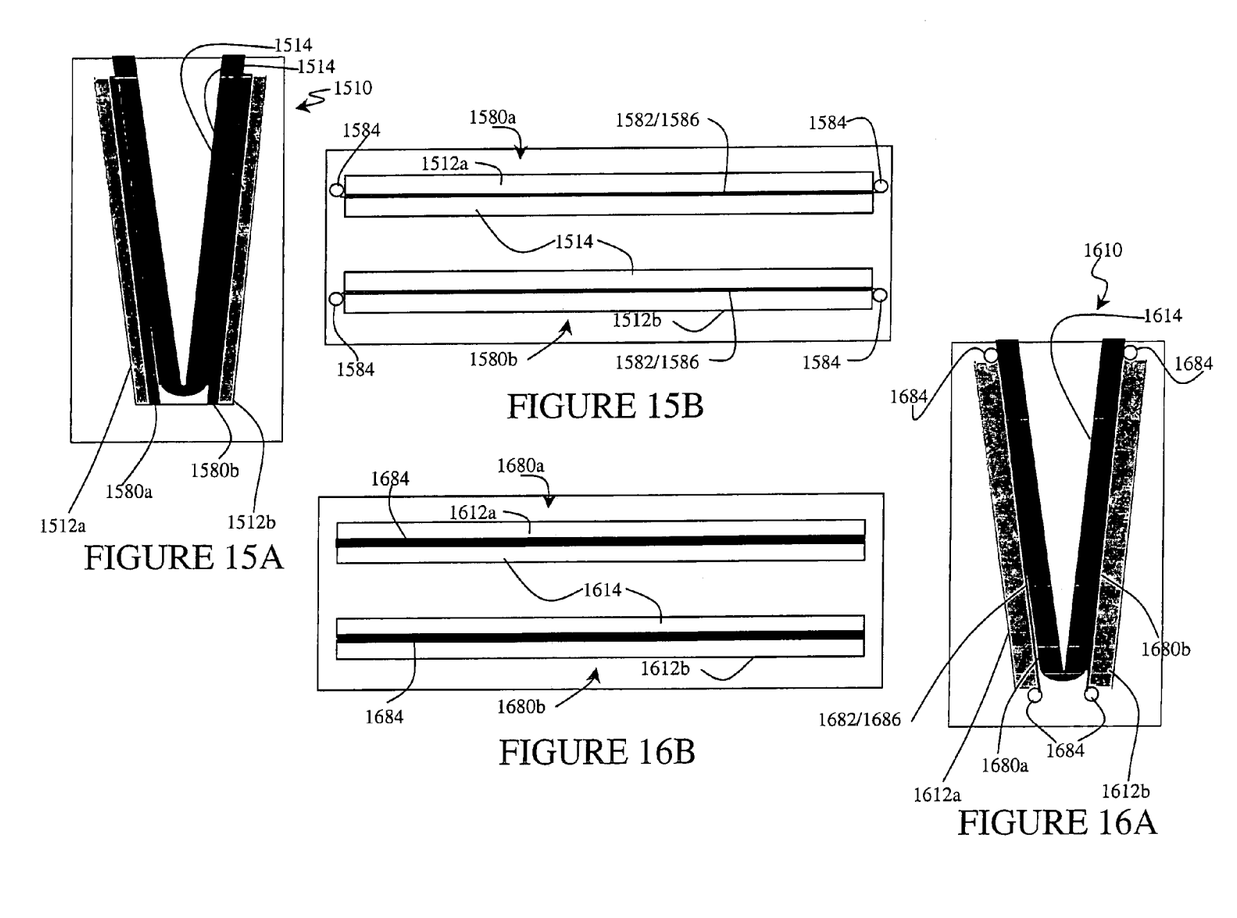
FIGS. 15A and 15B depict an embodiment of a cell system using an ionic barrier system shown in FIGS. 14A–14E.
FIGS. 16A and 16B depict another embodiment of a cell system using an ionic barrier system shown in FIGS. 14A–14E.

The barrier system as shown in FIGS. 14A through 14E may be used in a variety of configurations. For example, as used in a system shown generally in FIG. 7, the reels may be positioned in a variety of locations, as shown generally in FIGS. 15A and 15B, and in FIGS. 16A and 16B. For example, has shown in FIGS. 15A and 15B, the barrier may extend across the length of the cell system. FIG. 15B, showing a top view, depicts a set of the reels 1484 (one for each side of the wedge shaped cathode 1514) providing selective isolation between the electrodes. More particularly, the barrier system 1580*a* including reels 1584 allows extension of the barrier 1586 to provide isolation, or a frame 1582 to allow ionic communication between electrodes 1512*a* and 1514. Likewise, the barrier system 1580*b* is provided to prevent or allow ionic communication between anode portion 1512*b* and the cathode 1514.

In another configuration, and shown in FIGS. 16A and 16B, the reels may be provided on the top and bottom portions of the cell. The system operates in a similar manner, but may have certain benefits over the system in FIGS. 15A and 15B, for example, where the cell system 1610 is extremely long, and it would be cumbersome to move a shorter barrier along the length (i.e., depth into the page as shown in the Figures), as opposed to moving a larger barrier a shorter distance.

With the incorporation of the ionic isolating or conductivity reducing systems described herein, it is capable to interrupt reaction of the electrochemical cell on demand. This may substantially reduced or eliminate cell discharge, a common problem with various electrochemical cells including metal air cells. Further, the electrochemical reaction may be restored on demand by restoring ionic communication between electrodes.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell comprising:
   an anode;
   a cathode;
   a separator between the anode and the cathode, the separator allowing ionic conduction between the anode and the cathode but not allowing electrical conduction between the anode and the cathode; and
   a hinge configured, positioned, and dimensioned such that upon actuation of the hinge, ionic communication between the anode and the cathode is isolated, or the ionic conductivity between the anode and the cathode is reduced,
   wherein the anode, the cathode, or both the anode in the cathode are configured to allow selective ionic isolation between the anode and cathode, or selective reduction of ionic conductivity between the anode and the cathode.

2. The electrochemical cell as in claim 1, wherein the anode is positioned in a frame, the hinge attached to the anode frame.

3. The electrochemical cell as in claim 1, wherein the cathode is positioned in a frame, the hinge attached to the cathode frame.

4. The electrochemical cell as in claim 1, wherein said hinge comprises a shape memory alloy hinge configured, positioned, and dimensioned such that upon shape change of the shape memory alloy hinge, ionic communication between the anode and the cathode is isolated, or the ionic conductivity between the anode and the cathode is reduced.

5. The electrochemical cell as in claim 1, wherein the anode comprises a metal fuel.

6. The electrochemical cell as in claim 1, wherein the cathode comprises an air diffusion electrode.

7. The electrochemical cell as in claim 1, wherein the separator comprises a membrane having electrolyte incorporated therein.

* * * * *